(12) United States Patent
Kummer et al.

(10) Patent No.: US 9,350,937 B2
(45) Date of Patent: May 24, 2016

(54) SYSTEM AND METHOD FOR DYNAMICALLY ADJUSTING RECORDING PARAMETERS

(71) Applicant: EchoStar Technologies, L.L.C., Englewood, CO (US)

(72) Inventors: David A. Kummer, Highlands Ranch, CO (US); Erik J. Swenson, Arapahoe, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 60 days.

(21) Appl. No.: 14/154,887

(22) Filed: Jan. 14, 2014

(65) Prior Publication Data

US 2014/0126889 A1 May 8, 2014

Related U.S. Application Data

(63) Continuation of application No. 13/592,976, filed on Aug. 23, 2012, now Pat. No. 8,660,412.

(60) Provisional application No. 61/526,591, filed on Aug. 23, 2011.

(51) Int. Cl.
*H04N 5/76* (2006.01)
*H04N 5/91* (2006.01)
(Continued)

(52) U.S. Cl.
CPC .............. *H04N 5/91* (2013.01); *H04N 5/782* (2013.01); *H04N 9/79* (2013.01); *H04N 21/4312* (2013.01);
(Continued)

(58) Field of Classification Search
CPC ......... H04N 5/782; H04N 5/91; H04N 5/913; H04N 9/79; H04N 21/6543; H04N 21/4334; H04N 21/4345; H04N 21/4821; H04N 21/4312

USPC ................. 386/298, 291, 296, 297, 323
See application file for complete search history.

(56) References Cited

U.S. PATENT DOCUMENTS

| 4,706,121 A | 11/1987 | Young |
| 4,723,246 A | 2/1988 | Weldon, Jr. |

(Continued)

FOREIGN PATENT DOCUMENTS

| CN | 101202600 A | 6/2008 |
| CN | 101310532 A | 11/2008 |

(Continued)

OTHER PUBLICATIONS

U.S. Appl. No. 14/095,860, filed Dec. 3, 2013 Final Office Action mailed May 1, 2015, 18 pages.

(Continued)

*Primary Examiner* — Robert Chevalier
(74) *Attorney, Agent, or Firm* — Kilpatrick Townsend & Stockton LLP (57) ABSTRACT

Content receivers may be configured to simultaneously record multiple instances of content for multiple programming channels based on content provider instructions. Systems and methods utilize the content receivers to dynamically adjust recording parameters to account for instances of content with a start time and/or end time that falls outside of predefined recording parameters. The dynamically adjusted recording parameters may adjust the number of channels recorded and/or instances of content recorded. The content receiver may compare programming information received at a processing unit with predefined recording parameters and may dynamically adjust the recording parameters based on the comparison. The content receiver may generate on screen display content to include information on the dynamically adjusted recording parameters and may transmit the on screen display content to a content display device for notifying the user of the dynamically adjusted recoding parameters.

13 Claims, 6 Drawing Sheets

(51) Int. Cl.
- *H04N 9/79* (2006.01)
- *H04N 5/782* (2006.01)
- *H04N 21/431* (2011.01)
- *H04N 21/433* (2011.01)
- *H04N 21/434* (2011.01)
- *H04N 21/482* (2011.01)
- *H04N 21/6543* (2011.01)
- *H04N 5/913* (2006.01)

(52) U.S. Cl.
CPC ....... *H04N 21/4334* (2013.01); *H04N 21/4345* (2013.01); *H04N 21/4821* (2013.01); *H04N 21/6543* (2013.01); *H04N 5/913* (2013.01)

(56) References Cited

U.S. PATENT DOCUMENTS

| | | |
|---|---|---|
| 4,802,215 A | 1/1989 | Mason |
| 5,187,589 A | 2/1993 | Kono et al. |
| 5,335,277 A | 8/1994 | Harvey et al. |
| 5,483,277 A | 1/1996 | Granger |
| 5,488,658 A | 1/1996 | Hirashima |
| 5,541,738 A | 7/1996 | Mankovitz |
| 5,642,153 A | 6/1997 | Chaney et al. |
| 5,682,597 A | 10/1997 | Ganek et al. |
| 5,684,969 A | 11/1997 | Ishida |
| 5,724,646 A | 3/1998 | Ganek et al. |
| 5,805,763 A | 9/1998 | Lawler et al. |
| 5,974,218 A | 10/1999 | Nagasaka et al. |
| 6,049,333 A | 4/2000 | LaJoie et al. |
| 6,263,504 B1 | 7/2001 | Ebisawa |
| 6,453,115 B1 | 9/2002 | Boyle |
| 6,628,891 B1 | 9/2003 | Vantalon et al. |
| 6,701,528 B1 | 3/2004 | Arsenault et al. |
| 6,766,523 B2 | 7/2004 | Herley |
| 6,798,971 B2 | 9/2004 | Potrebic |
| 6,938,208 B2 | 8/2005 | Reichardt |
| 7,024,676 B1 | 4/2006 | Klopfenstein |
| 7,409,140 B2 | 8/2008 | Rodriguez et al. |
| 7,487,529 B1 | 2/2009 | Orlick |
| 7,490,169 B1 | 2/2009 | Ogdon et al. |
| 7,493,312 B2 | 2/2009 | Liu et al. |
| 7,505,081 B2 | 3/2009 | Eshleman |
| 7,542,656 B2 | 6/2009 | Cho et al. |
| 7,577,751 B2 | 8/2009 | Vinson et al. |
| 7,590,993 B1 | 9/2009 | Hendricks et al. |
| 7,684,672 B2 | 3/2010 | Matoba |
| 7,715,552 B2 | 5/2010 | Pinder et al. |
| 7,730,517 B1 | 6/2010 | Rey et al. |
| 7,739,711 B2 | 6/2010 | Finseth et al. |
| 7,760,986 B2 | 7/2010 | Beuque |
| 7,804,861 B2 | 9/2010 | Kim |
| 7,848,618 B2 | 12/2010 | Potrebic et al. |
| 7,856,557 B2 | 12/2010 | Beuque |
| 7,926,078 B2 | 4/2011 | Arsenault et al. |
| 7,929,697 B2 | 4/2011 | McNeely et al. |
| 7,962,937 B2 | 6/2011 | Cho et al. |
| 8,006,268 B2 | 8/2011 | Sloo |
| 8,201,194 B2 | 6/2012 | Wijnands et al. |
| 8,321,466 B2 | 11/2012 | Black et al. |
| 8,364,671 B1 | 1/2013 | Sinton et al. |
| 8,437,622 B2 | 5/2013 | Casagrande |
| 8,447,170 B2 | 5/2013 | Casagrande |
| 8,566,873 B2 | 10/2013 | Sie et al. |
| 8,584,167 B2 | 11/2013 | Vanduyn |
| 8,606,088 B2 | 12/2013 | Kummer et al. |
| 8,627,349 B2 | 1/2014 | Kirby et al. |
| 8,660,412 B2 | 2/2014 | Kummer et al. |
| 8,763,027 B2 | 6/2014 | Martch |
| 8,774,608 B2 | 7/2014 | Kummer et al. |
| 8,819,722 B2 | 8/2014 | Kummer et al. |
| 8,819,761 B2 | 8/2014 | Minnick |
| 8,850,476 B2 | 9/2014 | VanDuyn et al. |
| 8,867,893 B2 | 10/2014 | Kirby |
| 8,959,544 B2 | 2/2015 | Kummer et al. |
| 8,959,566 B2 | 2/2015 | Kummer |
| 8,989,562 B2 | 3/2015 | Kummer et al. |
| 8,997,153 B2 | 3/2015 | Templeman |
| 9,031,385 B2 | 5/2015 | Casagrande et al. |
| 9,043,843 B2 | 5/2015 | Templeman et al. |
| 9,055,274 B2 | 6/2015 | Casagrande |
| 9,088,763 B2 | 7/2015 | Martch et al. |
| 9,177,605 B2 | 11/2015 | Minnick et al. |
| 9,177,606 B2 | 11/2015 | Kirby |
| 9,185,331 B2 | 11/2015 | Martch et al. |
| 9,191,694 B2 | 11/2015 | Casagrande |
| 9,202,524 B2 | 12/2015 | Martch et al. |
| 9,264,779 B2 | 2/2016 | Kirby et al. |
| 9,269,397 B2 | 2/2016 | Casagrande et al. |
| 2001/0028782 A1 | 10/2001 | Ohno et al. |
| 2001/0033736 A1 | 10/2001 | Yap et al. |
| 2001/0034787 A1 | 10/2001 | Takao et al. |
| 2002/0044658 A1 | 4/2002 | Wasilewski et al. |
| 2002/0054752 A1 | 5/2002 | Wood et al. |
| 2002/0055343 A1 | 5/2002 | Stetzler et al. |
| 2002/0087979 A1 | 7/2002 | Dudkiewicz et al. |
| 2002/0087983 A1 | 7/2002 | Son et al. |
| 2002/0092021 A1 | 7/2002 | Yap et al. |
| 2002/0095510 A1 | 7/2002 | Sie et al. |
| 2002/0097340 A1 | 7/2002 | Takagi et al. |
| 2002/0116705 A1 | 8/2002 | Perlman |
| 2002/0120925 A1 | 8/2002 | Logan |
| 2002/0141431 A1 | 10/2002 | Tripathy |
| 2002/0144266 A1 | 10/2002 | Goldman et al. |
| 2002/0152299 A1 | 10/2002 | Traversat et al. |
| 2002/0164147 A1 | 11/2002 | Suda |
| 2002/0168178 A1 | 11/2002 | Rodriguez et al. |
| 2002/0174430 A1 | 11/2002 | Ellis et al. |
| 2002/0184638 A1 | 12/2002 | Agnihotri et al. |
| 2002/0188943 A1 | 12/2002 | Freeman et al. |
| 2003/0005454 A1 | 1/2003 | Rodriguez et al. |
| 2003/0026423 A1 | 2/2003 | Unger et al. |
| 2003/0078930 A1 | 4/2003 | Surcouf et al. |
| 2003/0110514 A1 | 6/2003 | West et al. |
| 2003/0149988 A1 | 8/2003 | Ellis et al. |
| 2003/0152360 A1 | 8/2003 | Mukai et al. |
| 2003/0156826 A1 | 8/2003 | Sonoda et al. |
| 2003/0177492 A1 | 9/2003 | Kanou |
| 2003/0177495 A1 | 9/2003 | Needham et al. |
| 2003/0200548 A1 | 10/2003 | Baran et al. |
| 2003/0208763 A1 | 11/2003 | McElhatten et al. |
| 2003/0208767 A1 | 11/2003 | Williamson et al. |
| 2003/0226150 A1 | 12/2003 | Berberet et al. |
| 2004/0001087 A1 | 1/2004 | Warmus et al. |
| 2004/0003118 A1 | 1/2004 | Brown et al. |
| 2004/0015992 A1 | 1/2004 | Hasegawa et al. |
| 2004/0015999 A1 | 1/2004 | Carlucci et al. |
| 2004/0078829 A1 | 4/2004 | Patel et al. |
| 2004/0103428 A1 | 5/2004 | Seok et al. |
| 2004/0128682 A1 | 7/2004 | Liga et al. |
| 2004/0133923 A1 | 7/2004 | Watson et al. |
| 2004/0162871 A1 | 8/2004 | Pabla et al. |
| 2004/0218905 A1 | 11/2004 | Green et al. |
| 2004/0242150 A1 | 12/2004 | Wright et al. |
| 2004/0268387 A1 | 12/2004 | Wendling |
| 2005/0002640 A1 | 1/2005 | Putterman |
| 2005/0034171 A1 | 2/2005 | Benya |
| 2005/0083865 A1 | 4/2005 | Ashley et al. |
| 2005/0120049 A1 | 6/2005 | Kanegae et al. |
| 2005/0125683 A1 | 6/2005 | Matsuyama et al. |
| 2005/0147383 A1 | 7/2005 | Ihara |
| 2005/0180568 A1 | 8/2005 | Krause |
| 2005/0229213 A1 | 10/2005 | Ellis et al. |
| 2005/0271365 A1 | 12/2005 | Hisatomi |
| 2005/0273819 A1 | 12/2005 | Knudson et al. |
| 2005/0281531 A1 | 12/2005 | Unmehopa |
| 2006/0010464 A1 | 1/2006 | Azami |
| 2006/0020962 A1 | 1/2006 | Stark et al. |
| 2006/0056800 A1 | 3/2006 | Shimagami et al. |
| 2006/0075434 A1 | 4/2006 | Chaney et al. |
| 2006/0080716 A1 | 4/2006 | Nishikawa et al. |
| 2006/0085828 A1 | 4/2006 | Dureau et al. |
| 2006/0206819 A1 | 9/2006 | Tsuji et al. |
| 2006/0212900 A1 | 9/2006 | Ismail et al. |

(56) References Cited

U.S. PATENT DOCUMENTS

| | | |
|---|---|---|
| 2006/0215993 A1 | 9/2006 | Yamada |
| 2006/0274208 A1 | 12/2006 | Pedlow |
| 2007/0016546 A1 | 1/2007 | De Vorchik et al. |
| 2007/0039032 A1 | 2/2007 | Goldey et al. |
| 2007/0061378 A1 | 3/2007 | Lee et al. |
| 2007/0154163 A1 | 7/2007 | Cordray |
| 2007/0157248 A1 | 7/2007 | Ellis |
| 2007/0157253 A1 | 7/2007 | Ellis et al. |
| 2007/0165855 A1 | 7/2007 | Inui |
| 2007/0183745 A1 | 8/2007 | White |
| 2007/0192586 A1 | 8/2007 | McNeely |
| 2007/0204288 A1 | 8/2007 | Candelore |
| 2007/0234395 A1 | 10/2007 | Dureau et al. |
| 2007/0250856 A1 | 10/2007 | Leavens et al. |
| 2007/0258596 A1 | 11/2007 | Kahn et al. |
| 2008/0022347 A1 | 1/2008 | Cohen |
| 2008/0044158 A1 | 2/2008 | Kido |
| 2008/0046929 A1 | 2/2008 | Cho et al. |
| 2008/0052743 A1 | 2/2008 | Moore |
| 2008/0074547 A1 | 3/2008 | Ida |
| 2008/0092164 A1 | 4/2008 | Agarwal et al. |
| 2008/0092181 A1 | 4/2008 | Britt |
| 2008/0101760 A1 | 5/2008 | Waller |
| 2008/0104534 A1 | 5/2008 | Park et al. |
| 2008/0127253 A1 | 5/2008 | Zhang et al. |
| 2008/0137850 A1 | 6/2008 | Mamidwar |
| 2008/0141322 A1 | 6/2008 | Jang et al. |
| 2008/0144747 A1 | 6/2008 | Tomizawa |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222678 A1 | 9/2008 | Burke et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0273856 A1 | 11/2008 | Bumgardner |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2008/0307217 A1 | 12/2008 | Yukimatsu et al. |
| 2009/0025027 A1 | 1/2009 | Craner |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0110367 A1* | 4/2009 | Fukui .......................... 386/83 |
| 2009/0129741 A1 | 5/2009 | Kim |
| 2009/0129749 A1 | 5/2009 | Oyamatsu et al. |
| 2009/0136206 A1 | 5/2009 | Aisu |
| 2009/0150941 A1 | 6/2009 | Riedl et al. |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0210912 A1 | 8/2009 | Cholas et al. |
| 2009/0235298 A1 | 9/2009 | Carlberg et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2009/0320084 A1 | 12/2009 | Azam et al. |
| 2009/0324203 A1 | 12/2009 | Wiklof |
| 2010/0020794 A1 | 1/2010 | Cholas et al. |
| 2010/0037282 A1 | 2/2010 | Iwata et al. |
| 2010/0043022 A1 | 2/2010 | Kaftan |
| 2010/0050225 A1 | 2/2010 | Bennett |
| 2010/0086277 A1 | 4/2010 | Craner |
| 2010/0095323 A1 | 4/2010 | Williamson et al. |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0146581 A1 | 6/2010 | Erk |
| 2010/0158479 A1 | 6/2010 | Craner |
| 2010/0158480 A1 | 6/2010 | Jung et al. |
| 2010/0162285 A1 | 6/2010 | Cohen et al. |
| 2010/0169926 A1 | 7/2010 | Westberg et al. |
| 2010/0195827 A1 | 8/2010 | Lee et al. |
| 2010/0217613 A1 | 8/2010 | Kelly |
| 2010/0232604 A1 | 9/2010 | Eklund, II |
| 2010/0235862 A1 | 9/2010 | Adachi |
| 2010/0239228 A1 | 9/2010 | Sano |
| 2010/0242079 A1 | 9/2010 | Riedl et al. |
| 2010/0246582 A1 | 9/2010 | Salinger et al. |
| 2010/0247067 A1 | 9/2010 | Gratton |
| 2010/0251304 A1 | 9/2010 | Donoghue et al. |
| 2010/0251305 A1 | 9/2010 | Kimble et al. |
| 2010/0254386 A1 | 10/2010 | Salinger et al. |
| 2010/0265391 A1 | 10/2010 | Muramatsu et al. |
| 2010/0284537 A1 | 11/2010 | Inbar |
| 2010/0293583 A1 | 11/2010 | Loebig et al. |
| 2010/0299528 A1 | 11/2010 | Le Floch |
| 2010/0306401 A1 | 12/2010 | Gilson |
| 2010/0313222 A1 | 12/2010 | Lee et al. |
| 2010/0319037 A1 | 12/2010 | Kim |
| 2010/0329645 A1 | 12/2010 | Sakamoto |
| 2011/0001879 A1 | 1/2011 | Goldey et al. |
| 2011/0007218 A1 | 1/2011 | Moran et al. |
| 2011/0043652 A1 | 2/2011 | King et al. |
| 2011/0078750 A1 | 3/2011 | Tam et al. |
| 2011/0080529 A1 | 4/2011 | Wong |
| 2011/0099364 A1 | 4/2011 | Robyr et al. |
| 2011/0131413 A1 | 6/2011 | Moon et al. |
| 2011/0138169 A1 | 6/2011 | Michel |
| 2011/0138424 A1 | 6/2011 | Vlot |
| 2011/0145854 A1 | 6/2011 | Bacon et al. |
| 2011/0150429 A1 | 6/2011 | Kaneko |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0235701 A1 | 9/2011 | Kim |
| 2011/0239249 A1 | 9/2011 | Murison et al. |
| 2011/0255002 A1 | 10/2011 | Witheiler |
| 2011/0286719 A1* | 11/2011 | Woods .......................... 386/293 |
| 2011/0311045 A1 | 12/2011 | Candelore et al. |
| 2012/0183276 A1 | 7/2012 | Quan et al. |
| 2012/0198501 A1 | 8/2012 | Ruan et al. |
| 2012/0236933 A1 | 9/2012 | Saitoh |
| 2012/0278837 A1 | 11/2012 | Curtis et al. |
| 2012/0296745 A1 | 11/2012 | Harper et al. |
| 2012/0301104 A1 | 11/2012 | Dove |
| 2012/0311534 A1 | 12/2012 | Fox et al. |
| 2012/0311634 A1 | 12/2012 | Van Duyn |
| 2012/0331505 A1 | 12/2012 | Chun et al. |
| 2013/0014146 A1 | 1/2013 | Bhatia et al. |
| 2013/0014159 A1 | 1/2013 | Wiser et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |

(56) References Cited

U.S. PATENT DOCUMENTS

| | | |
|---|---|---|
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0130094 A1 | 5/2014 | Kirby et al. |
| 2014/0201767 A1 | 7/2014 | Seiden et al. |
| 2014/0341377 A1 | 11/2014 | Kummer et al. |
| 2014/0344858 A1 | 11/2014 | Minnick |
| 2014/0363139 A1 | 12/2014 | Kirby |
| 2015/0040166 A1 | 2/2015 | Tamura et al. |
| 2015/0095948 A1 | 4/2015 | Kummer et al. |
| 2015/0104146 A1 | 4/2015 | Higuchi et al. |
| 2015/0121430 A1 | 4/2015 | Templeman |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1 | 8/2015 | Protrebic |
| 2015/0245113 A1 | 8/2015 | Casagrande |

FOREIGN PATENT DOCUMENTS

| | | |
|---|---|---|
| CN | 101 404 780 A | 4/2009 |
| CN | 101978690 A | 2/2011 |
| EP | 0 903 743 A | 3/1999 |
| EP | 0 973 333 A | 1/2000 |
| EP | 1 001 631 A1 | 5/2000 |
| EP | 1 168 347 A | 1/2002 |
| EP | 1372339 A2 | 12/2003 |
| EP | 1 447 983 A1 | 8/2004 |
| EP | 1 667 452 B1 | 7/2006 |
| EP | 1 742 467 A2 | 1/2007 |
| EP | 2 018 059 A1 | 1/2009 |
| EP | 2 317 767 A1 | 5/2011 |
| EP | 2 357 563 A1 | 8/2011 |
| EP | 2 403 239 A1 | 1/2012 |
| EP | 2 541 929 A1 | 1/2013 |
| EP | 2 826 197 A1 | 1/2015 |
| EP | 2 826 238 A1 | 1/2015 |
| IN | 9740/CHENP/2013 A | 9/2014 |
| JP | 2007 116525 A | 5/2007 |
| JP | 2010165058 A | 7/2010 |
| WO | 98/12872 A1 | 3/1998 |
| WO | 02/41625 A1 | 5/2002 |
| WO | 2004/057610 A1 | 7/2004 |
| WO | 2007/047410 A2 | 4/2007 |
| WO | 2008/010689 A1 | 1/2008 |
| WO | 2008/060486 A2 | 5/2008 |
| WO | 2011/027236 A1 | 3/2011 |
| WO | 2011/081729 A1 | 7/2011 |
| WO | 2012/003693 A1 | 1/2012 |
| WO | 2013/028824 A3 | 2/2013 |
| WO | 2013/028829 A2 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |

OTHER PUBLICATIONS

U.S. Appl. No. 14/060,388, filed Oct. 22, 2013, Notice of Allowance mailed Apr. 13, 2015, 44 pages.
U.S. Appl. No. 13/888,012, filed May 6, 2013 Non-Final Rejection mailed Apr. 6, 2015, 36 pages.
U.S. Appl. No. 13/614,899, filed Sep. 13, 2012, Notice of Allowance mailed Mar. 13, 2015, 35 pages.
U.S. Appl. No. 13/302,852, filed Nov. 22, 2011, Final Rejection mailed Mar. 30, 2015, 29 pages.
U.S. Appl. No. 13/215,598, filed Aug. 23, 2011 Final Office Action mailed May 5, 2105, 17 pages.
European Search Report for EP 12825653 dated Mar. 11, 2015, 7 pages.
Supplementary European Search Report for Application No. EP 12825147 dated Mar. 27, 2015, 9 pages.
The Notice of Allowance by the Mexican Institute of Industrial Property for Mexican Patent Application No. MX/a/2013/014907 dated Feb. 20, 2015 is not translated into English, 1 page.
The Notice of Allowance by the Mexican Institute of Industrial Property for Mexican Patent Application No. MX/a/2013/014677 dated Mar. 19, 2015 is not translated into English, 1 page.
The second Office Action dated Feb. 26, 2015 for Mexican Pat. Appln. No. MX/a/2013/014217 is not translated into English, 3 pages.
U.S. Appl. No. 13/801,968, filed Mar. 13, 2013 Non Final Office Action mailed May 21, 2015, 49 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
U.S. Appl. No. 13/302,852, filed Nov. 22, 2011 Non-Final Rejection mailed Sep. 2, 2014, 27 pages.
U.S. Appl. No. 13/793,636, filed Mar. 11, 2013, Non-Final Office Action mailed Sep. 29, 2014, 27 pages.
U.S. Appl. No. 13/800,477, filed Mar. 13, 2013 Non-Final Office Action mailed Sep. 11, 2014, 34 pages.
Author Unknown, "EE Launches home TV service in UK," dated Oct. 8, 2014, 3 pages. Retrieved on Oct. 13, 2014 from http://www.bbc.com/news/technology-29535279.
Author Unknown, "EE TV It's simply great television," Accessed on Oct. 13, 2014, 11 pages. Retrieved from https//ee.co.uk/ee-and-me/ee-tv.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
U.S. Appl. No. 13/856,752, filed Apr. 4, 2013 Notice of Allowance mailed Feb. 10, 2015, 20 pages.
U.S. Appl. No. 13/799,604, filed Mar. 13, 2013, Final Office Action mailed Jan. 14, 2015, 36 pages.
U.S. Appl. No. 13/797,173, filed Mar. 12, 2013 Notice of Allowance mailed Feb. 26, 2015, 19 pages.
U.S. Appl. No. 13/793,636, filed Mar. 11, 2013, Notice of Allowance mailed Jan. 28, 2015, 43 pages.
U.S. Appl. No. 13/800,477, filed Mar. 13, 2013 Notice of Allowance mailed Feb. 18, 2015, 18 pages.
Extended European Search Report for EP 12825474 mailed Jan. 7, 2015, 6 pages.
Extended European Search Report for EP 12825430 mailed Feb. 3, 2015, all pages.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.
International Search Report and Written Opinion of PCT/US2012/51992 mailed Nov. 2, 2012, 15 pages.
International Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.

(56) References Cited

OTHER PUBLICATIONS

International Preliminary Report on Patentability for PCT/US2012/052002 mailed on Apr. 17, 2014, 10 pages.
International Search Report and Written Opinion of PCT/US2012/51964 mailed Nov. 2, 2012, 13 pages.
International Search Report and Written Opinion of PCT/US2012/052011 mailed Dec. 17, 2012, 44 pages.
International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
Author Unknown, "Move Networks is Delivering the Next Generation of Television," Move Networks, 2010, obtained online at http://movenetworks.com/, 2 pages.
Design and implementation of a multi-stream cableCARD with a high-speed DVB-common descrambler; Joonyoung Jung, Ohyung Kwon, Sooin Lee; In proceeding of: Proceedings of the 14th ACM International Conference on Multimedia, Santa Barbara, CA, USA, Oct. 23-27, 2006, 4 pages.
U.S. Appl. No. 13/149,852, filed May 31, 2011, Non-Final Office Action mailed Dec. 12, 2012, 9 pages.
U.S. Appl. No. 13/149,852, filed May 31, 2011, Final Office Action mailed Mar. 26, 2013, 13 pages.
U.S. Appl. No. 13/149,852, filed May 31, 2011, Notice of Allowance mailed Jul. 11, 2013, 13 pages.
U.S. Appl. No. 13/286,157, filed Oct. 31, 2011, Non-Final Office Action mailed Jan. 17, 2013, 20 pages.
U.S. Appl. No. 13/286,157, filed Oct. 31, 2011, Non-Final Office Action mailed Jul. 25, 2013, 49 pages.
U.S. Appl. No. 13/286,157, filed Oct. 31, 2011, Notice of Allowance mailed Feb. 3, 2014, 81 pages.
U.S. Appl. No. 13/215,702, filed Aug. 23, 2011, Notice of Allowance mailed Feb. 11, 2013, 13 pages.
U.S. Appl. No. 13/288,002, filed Nov. 2, 2011, Non-final Office Action mailed Sep. 26, 2013, 15 pages.
U.S. Appl. No. 13/288,002, filed Nov. 2, 2011, Final Office Action mailed Mar. 27, 2014, 20 pages.
U.S. Appl. No. 13/302,852, filed Nov. 22, 2011, Non-Final Rejection mailed May 23, 2013, 19 pages.
U.S. Appl. No. 13/302,852, filed Nov. 22, 2011, Final Rejection mailed Dec. 9, 2013, 23 pages.
U.S. Appl. No. 13/324,831, filed Dec. 13, 2011 Non-Final Office Action mailed Feb. 28, 2013, 23 pages.
U.S. Appl. No. 13/324,831, filed Dec. 13, 2011 Notice of Allowance mailed Sep. 4, 2013, 22 pages.
U.S. Appl. No. 13/292,047, filed Nov. 8, 2011 Non-Final Office Action mailed Jan. 18, 2013, 17 pages.
U.S. Appl. No. 13/292,047, filed Nov. 8, 2011 Final Office Action mailed Aug. 19, 2013, 17 pages.
U.S. Appl. No. 13/614,899, filed Sep. 13, 2012 Non-Final Office Action mailed Feb. 5, 2013, 17 pages.
U.S. Appl. No. 13/614,899, filed Sep. 13, 2012 Non-Final Office Action mailed Sep. 17, 2013, 17 pages.
U.S. Appl. No. 13/614,899, filed Sep. 13, 2012, Final Office Action mailed Mar. 17, 2014, 41 pages.
U.S. Appl. No. 13/291,014, filed Nov. 7, 2011, Non-Final Office Action mailed Mar. 29, 2013, 21 pages.
U.S. Appl. No. 13/291,014, filed Nov. 7, 2011, Notice of Allowance mailed Aug. 7, 2013, 16 pages.
U.S. Appl. No. 13/215,598, filed Aug. 23, 2011, Non-Final Office Action mailed Jun. 20, 2013, 15 pages.
U.S. Appl. No. 13/215,598, filed Aug. 23, 2011, Final Office Action mailed Nov. 21, 2013, 23 pages.
U.S. Appl. No. 13/215,598, filed Aug. 23, 2011, Non-Final Office Action mailed Feb. 6, 2014, 12 pages.
U.S. Appl. No. 13/215,655, filed Aug. 23, 2011, Non-Final Office Action mailed Sep. 6, 2013, 27 pages.
U.S. Appl. No. 13/215,655, filed Aug. 23, 2011, Final Office Action mailed Dec. 18, 2013, 20 pages.
U.S. Appl. No. 13/215,916 filed Aug. 23, 2011, Notice of Allowance mailed Jan. 4, 2013, 10 pages.
U.S. Appl. No. 13/294,005, filed Nov. 11, 2011, Non-Final Office Action mailed Aug. 14, 2013, 32 pages.
U.S. Appl. No. 13/294,005, filed Nov. 11, 2011, Final Office Action mailed Jan. 3, 2014, 29 pages.
U.S. Appl. No. 13/592,976, filed Aug. 23, 2012, Notice of Allowance mailed Oct. 7, 2013, 18 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/829,350, filed Mar. 14, 2013, Non Final Office Action mailed Feb. 28, 2014, 29 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Non Final Office Action mailed Oct. 25, 2013, 79 pages.
U.S. Appl. No. 13/799,719, filed Mar. 13, 2013, Notice of Allowance mailed Apr. 23, 2014, 141 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
International Search Report of PCT/KR2007/003521 mailed on Oct. 23, 2007, 22 pages.
International Search Report of PCT/IB2003/005737 mailed on Mar. 2, 2004, 21 pages.
Jensen, Craig, "Fragmentation: the condition, the cause, the cure" 'Online!, Executive Software International, 1994; ISBN: 0964004909; retrieved from Internet: <URL: www.executive.com/fragbook/fragbook.htm> * Chapter: "How a disk works", Section: "The original problem". Retrieved on Jan. 9, 2014, 70 pages.
U.S. Appl. No. 13/795,914, filed Mar. 6, 2013, Non-Final Office Action mailed Oct. 11, 2013, 17 pages.
International Search Report and Written Opinion of PCT/US2013/32176 mailed on Jun. 25, 2013, 15 pages.
International Search Report and Written Opinion of PCT/US2013/031565 mailed on May 31, 2013, 82 pages.
International Search Report and Written Opinion of PCT/US2013/031915 mailed on Jun. 3, 2013, 7 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug 23, 2011 Final Office Action mailed Jul. 2, 2014, 22 pages.
U.S. Appl. No. 13/294,005, filed Nov. 11, 2011, Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
Extended European Search Report for EP 12825080 mailed Sep. 11, 2014, 10 pages.
Extended European Search Report for EP 12825521 mailed Nov. 24, 2014, 7 pages.
International Search Report and Written Opinion of PCT/US2013/031440 mailed May 30, 2013, 14 pages.
International Preliminary Report on Patentability for PCT/US2013/031440 mailed Sep. 25, 2014, 8 pages.
The Office Action dated Nov. 6, 2014 for Mexican Patent Application No. MX/a/2013/014677 is not translated into English, 2 pages.

(56) References Cited

OTHER PUBLICATIONS

U.S. Appl. No. 14/095,860, filed Dec. 3, 2013 Non-Final Office Action mailed Dec. 26, 2014, 45 pages.
U.S. Appl. No. 14/043,617, filed Oct. 1, 2013 Non-Final Office Action mailed Jan. 5, 2015, 45 pages.
U.S. Appl. No. 13/856,752, filed Apr. 4, 2013 Non Final Office Action mailed Nov. 5, 2014, 34 pages.
U.S. Appl. No. 13/829,350, filed Mar. 14, 2013 Final Office Action mailed Jan. 23, 2015, 18 pages.
U.S. Appl. No. 13/799,653, filed Mar. 13, 2013 Notice of Allowance mailed Nov. 26, 2014, 32 pages.
U.S. Appl. No. 13/797,173, filed Mar. 12, 2013 Notice of Allowance mailed Nov. 24, 2014, 37 pages.
U.S. Appl. No. 13/757,168, filed Feb. 1, 2013 Notice of Allowance mailed Oct. 14, 2014, 28 pages.
U.S. Appl. No. 13/294,005, filed Nov. 11, 2011 Notice of Allowance mailed Oct. 31, 2014, 24 pages.
U.S. Appl. No. 13/292,047, filed Nov. 8, 2011 Final Office Action mailed Jan. 13, 2015, 22 pages.
U.S. Appl. No. 13/215,598, filed Aug 23, 2011 Non-Final Office Action mailed Nov. 25, 2014, 18 pages.
Supplementary European Search Report for EP 13760902, mailed Oct. 20, 2015, all pages.
Supplementary European Search Report for EP 13761427, mailed Oct. 19, 2015, all pages.
Office Action dated Jul. 31, 2015 for Mexican Patent Application No. MX/a/2014/009919, 2 pages.
U.S. Appl. No. 13/786,915, filed Mar. 6, 2013, Non Final Rejection mailed Oct. 15, 2015, 59 pages.
U.S. Appl. No. 13/801,994, Non Final Office Action mailed Oct. 7, 2015, 55 pages.
U.S. Appl. No. 14/095,860, filed Dec. 3, 2013, Notice of Allowance mailed Oct. 19, 2015, 14 pages.
U.S. Appl. No. 14/338,114, filed Jul. 22, 2014, Non-Final Office Action mailed Sep. 30, 2015, all pages.
U.S. Appl. No. 14/529,989, filed Oct. 31, 2014, Non-Final Office Action mailed Nov. 4, 2015, all pages.
U.S. Appl. No. 14/043,617, filed Oct. 1, 2013, Non-Final Office Action mailed Oct. 23, 2015, all pages.
U.S. Appl. No. 14/676,137, filed Apr. 1, 2015, Notice of Allowance mailed Sep. 28, 2015, 35 pages.
U.S. Appl. No. 14/467,959, filed Aug. 25, 2014 Notice of Allowance mailed Jun. 22, 2015, 36 pages.
U.S. Appl. No. 14/095,860, filed Dec. 3, 2013 Notice of Allowance mailed Jul. 13, 2015, 31 pages.
U.S. Appl. No. 14/043,617, filed Oct. 1, 2013 Final Office Action mailed Jul. 16, 2015, 45 pages.
U.S. Appl. No. 13/888,012, filed May 6, 2013 Notice of Allowance mailed Jul. 14, 2015, 18 pages.
U.S. Appl. No. 13/799,604, filed Mar. 13, 2013, Notice of Allowance mailed May 29, 2015, 46 pages.
U.S. Appl. No. 13/302,852, filed Nov. 22, 2011, Notice of Allowance mailed Jun. 19, 2015, 26 pages.
U.S. Appl. No. 13/292,047, filed Nov. 8, 2011 Non-Final Office Action mailed Jul. 7, 2015, 28 pages.
Supplementary European Search Report for EP 13761291.7 mailed Jul. 9, 2015, 8 pages.
The Notice of Allowance by the Mexican Institute of Industrial Property for Mexican Patent Application No. MX/a/2013/014671 dated Apr. 17, 2015, 1 page.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
U.S. Appl. No. 13/288,002, filed Nov. 2, 2011 Non Final Rejection mailed Jul. 28, 2015, 29 pages.
U.S. Appl. No. 13/829,350, filed Mar. 14, 2013 Notice of Allowance mailed Jul. 24, 2015, 29 pages.
Extended European Search Report for EP 13760237.1 received Jul. 21, 2015, 8 pages.
First Office Action and Search Report from the State Intellectual Property Office (SIPO) for CN 201280031434.7, issued Jul. 17, 2015, 12 pages.
Office Action dated Jul. 31, 2015 for Mexican Patent Application No. MX/a/2014/009928, 2 pages.
U.S. Appl. No. 14/340,190, filed Jul. 24, 2014, Non-Final Rejection mailed Aug. 31, 2015, 74 pages.
U.S. Appl. No. 13/799,604, filed Mar. 13, 2013, Notice of Allowance mailed Jul. 24, 2015, 34 pages.
Second Office Action for CN 201280031434.7, issued Dec. 23, 2015, 6 pages.
First Office Action issued by State Intellectual Property Office (SIPO) for CN 201280028697.2, issued Dec. 16, 2015, 11 pages.
Notice of Allowance received for Mexican Patent Appln. MX/a/2013/014991, mailed on Dec. 9, 2015, 1 page.
Notice of Allowance mailed Dec. 4, 2015 for Mexican Patent Application No. MX/a/2014/009723, 1 page.
U.S. Appl. No. 14/340,190, filed Jul. 24, 2014, Final Rejection mailed Feb. 19, 2016, 54 pages.
U.S. Appl. 13/288,002, filed Nov. 2, 2011 Final Rejection mailed Jan. 13, 2016, 22 pages.
U.S. Appl. No. 13/292,047, filed Nov. 8, 2011 Notice of Allowance mailed Jan. 29, 2016, 45 pages.
U.S. Appl. No. 13/215,598, filed Aug 23, 2011 Non Final Office Action mailed Dec. 15, 2015, all pages.
U.S. Appl. No. 14/589,090, Notice of Allowance mailed Feb. 9, 2016, 47 pages.
U.S. Appl. No. 14/591,549, Non Final Office Action mailed Dec. 31, 2015, 19 pages.
U.S. Appl. No. 14/338,114, filed Jul. 22, 2014 Notice of Allowance mailed Feb. 3, 2016, all pages.

* cited by examiner

SYSTEM AND METHOD FOR DYNAMICALLY ADJUSTING RECORDING PARAMETERS

PRIORITY CLAIM

This application is a Continuation of U.S. application Ser. No. 13/592,976 filed Aug. 23, 2012 and entitled "SYSTEM AND METHOD FOR DYNAMICALLY ADJUSTING RECORDING PARAMETERS," which claims the benefit under 35 U.S.C. §119(e) of U.S. Provisional Patent Application No. 61/526,591, entitled SYSTEM AND METHOD FOR DYNAMICALLY ADJUSTING RECORDING PARAMETERS, filed on Aug. 23, 2011, which is incorporated by reference in its entirety for any and all purposes.

FIELD OF THE INVENTION

This disclosure relates generally to utilizing content receivers to dynamically adjust recording parameters, and more specifically relates to dynamically adjusting a recording timeframe for one or more instances of content to be recorded based on programming information.

SUMMARY

The present disclosure discloses systems and methods for dynamically adjusting recording parameters (such as a recording timeframe) based on programming information received at a content receiver. The content receiver may receive the programming information from a content provider in the form of metadata that may include start and end time information for instances of content that are or will be received at the content receiver, and the content receiver may dynamically adjust the recording timeframe in response to the programming information received. In some implementations, the dynamically adjusted recording parameters include an adjusted number of channels and/or instances of content to be recorded. In some implementations, the programming information utilized to dynamically adjust the recording parameters may be service level and/or event level metadata. In some implementations, the recording parameters may be dynamically adjusted to differ from a predefined set of recording parameters. For example, the recording timeframe may be dynamically adjusted to begin before a predefined recording timeframe start time and/or may be dynamically adjusted to end after a predefined recording timeframe end time.

In one implementation, a method for adjusting recording parameters involves utilizing a content receiver determine from programming information for a plurality of instances of content, a start time and an end time for multiple of instances of content to be recorded simultaneously. The start time and the end time for the plurality of instances of content are compared with a predefined recording timeframe, and the recording timeframe for one or more of the plurality of instances of content is dynamically modified based on the comparison.

In another implementation, a system for adjusting recording parameters includes a content receiver with a processing unit for receiving programming information for a plurality of instances of content to be recorded simultaneously; a memory unit for storing the plurality of simultaneously recorded instances of content; and a communications unit for transmitting at least one of the simultaneously recorded instances of content to a content display device. The processing unit is configured to: receive programming information including a start time and an end time for a plurality of instances of content recorded simultaneously; compare the start time and the end time for the plurality of instances of content with a predefined recording timeframe; and dynamically modify the recording timeframe for one or more of the plurality of instances of content based on the comparison.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble and store each of the instances of content desired by the user.

Figure 1:
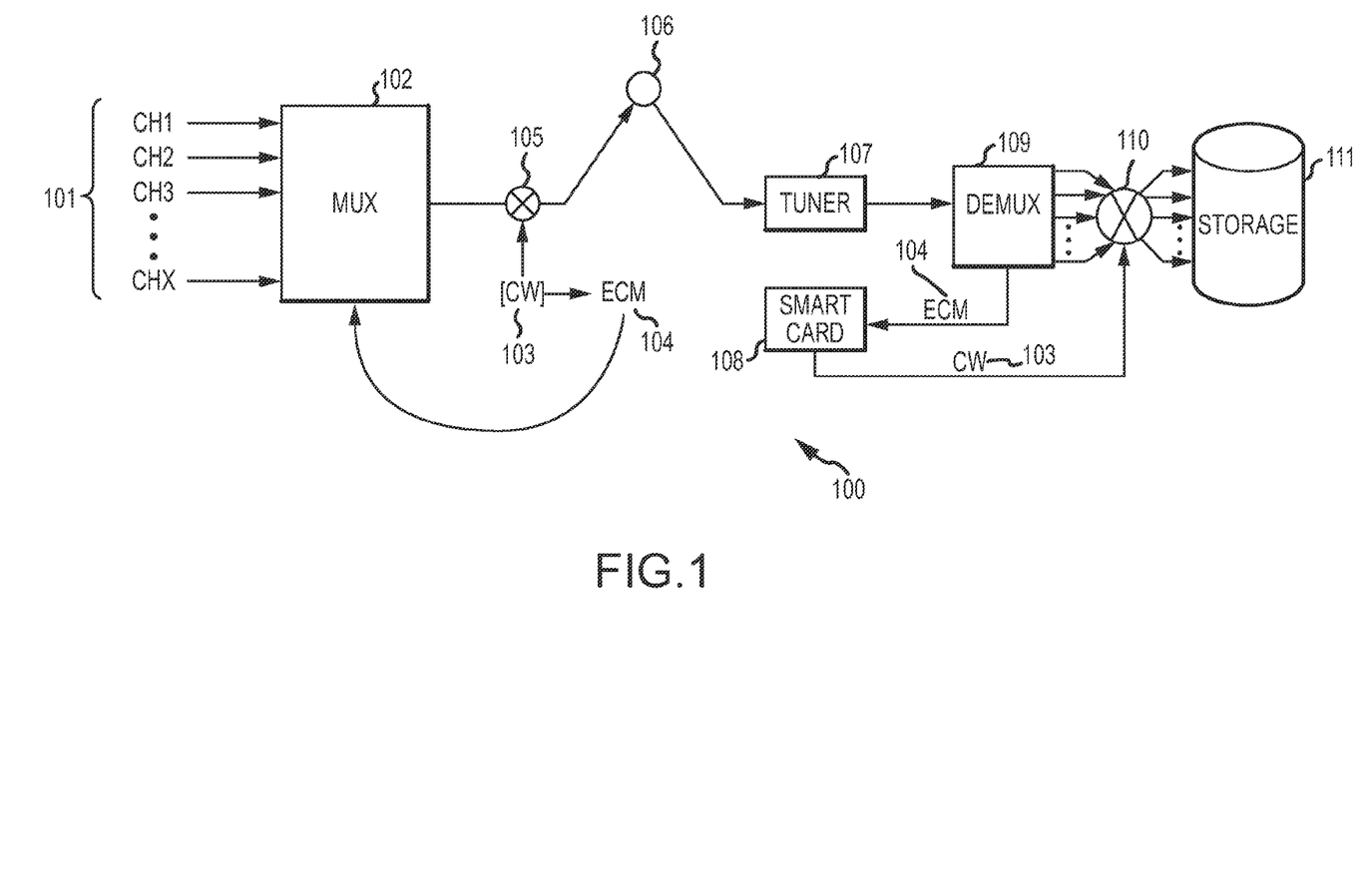
FIG. 1 is a block diagram illustrating a system for automatically recording multiple instances of content from one or more programming providers.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel utilizing one or more tuners. The content receiver may process only a subset of the programming channels by keeping the data associated with the particular programming channel and discarding data received via the tuned frequency band and multiplexed signal associated with other programming channels. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "prime-time events" associated with all channels defined as "prime-time television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive a frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency may be demultiplexed by a demultiplexer 109 and then descrambled by a descrambler 110 utilizing the CW before being stored in a non-transitory storage medium 111 (which may take the form of, but is not limited to, a magnetic storage medium; optical storage medium; magneto-optical storage medium; read only memory; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the code word prior to multiplexing. In another example, in some implementations, the data received via the tuned frequency may be demultiplexed before being individually descrambled utilizing the code word.

In view of the functionality of the system of FIG. 1 in which multiple instances of content are recorded simultaneously during a timeframe and stored in the non-transitory storage medium 111 of the content receiver (such as by utilizing predefined recording parameters set by the content provider), there is a need determine whether the recording parameters enable the content receiver to record the received content from start to finish, that enables additional instances of content to be recorded (e.g., in addition to predefined instances of content), and/or that enables additional programming channels to be recorded (e.g., in addition to predefined channels). For example, a recording parameter may include a timeframe for recording the multiple instances of content, and there is a need to determine whether the entire length of the each of the instances of content will be recorded based on the recoding timeframe to avoid the possibility of partially recording the instances of content. A partial recording is one where the instance of content is recorded after the start time and/or in which the recorded instance of content ended before the end time, thus resulting in the beginning and/or the end of the instance of content being cut-off of the recording. Such a partial recording is undesirable for a user that generally expects to replay the entire length of the instance of content from start to finish.

Accordingly, the present disclosure discloses systems and methods for dynamically adjusting recording parameters for recording one or more instances of content utilizing programming information received at a content receiver. In some implementations, a recording timeframe for one or more of the multiple instances of content to be recorded may be dynamically modified based on the programming information. In some implementations, a number of programming channels and/or instances of content may be changed from preset recording parameters or instructions, thereby dynamically adjusting the multiple instances of content to be simultaneously recorded. Information related to the dynamically adjusted recording timeframe, programming channels and/or instances of content may be utilized to generate an electronic programming guide ("EPG"), which may notify the user of the recording modification.

Figure 2:
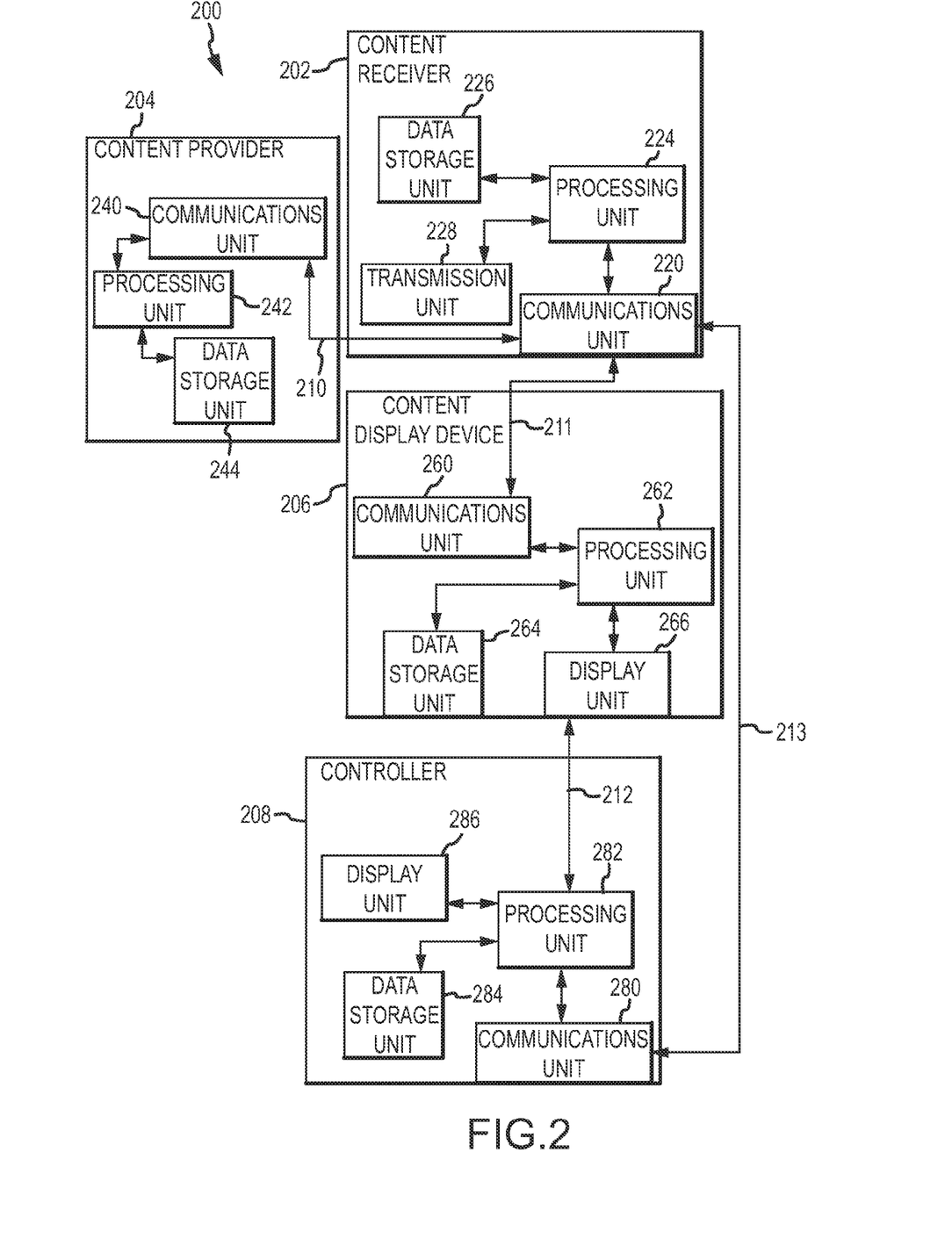
FIG. 2 is a block diagram illustrating a system for dynamically adjusting recording parameters.

FIG. 2 is a block diagram illustrating a system 200 for dynamically adjusting recording parameters. The system 200 may be at least partly incorporated into the system of FIG. 1. The system 200 includes a content receiver 202 (such as a set top box) for receiving and transmitting content (such as television programming and on screen display content), a content provider 204 for transmitting the content (such as a satellite or cable programming service provider), a content display device 206 for receiving and displaying the content (such as a television), and a controller 208 (such as a remote control) for transmitting data such as control signals to the content receiver 202.

The content receiver 202 is a device for receiving content from the content provider 204 and other external sources, for processing or decoding the content and for transmitting the content to the content display device 206. The content receiver 202 is, for example, a set top box, a television receiver, a digital video recorder, a computing device, a gaming device, or a television, which is generally located at a user's location (such as a user's residence or business). The content receiver 202 is operable to receive content from the content provider 204 (and/or another external source) by way of the transmission link 210. Such content is received by the communications unit 220 of the content receiver 202. The processing unit 224 may execute instructions for causing the data storage unit 226 (such as the non-transitory storage medium 111) to record multiple instances of content for a plurality of programming channels simultaneously within a single file described above in connection with FIG. 1, and for dynamically adjusting recording parameters such as predefined recording parameters. The transmission unit 228 may be communicatively coupled to the content display device 206 by way of the transmission link 211.

The content provider 204 (such as a satellite programming company, a cable company, an Internet service provider, e.g., an online video service or Internet video provider, and the like) is generally remotely located from the content receiver 202. The content transmitted may include metadata specifying recording parameters instructing the content receiver 202 to automatically record multiple instances of content simultaneously for multiple programming channels. The metadata may be provided from the content provider 204 to the content receiver 202 in the form of service information ("SI") tables, that may include service description tables ("SDT") and/or event information tables ("EIT").

The content display device 206 is generally arranged proximate to and is communicatively coupled to the content receiver 202 and displays content transmitted by the content receiver 202. While the content display device 206 and the content receiver 202 are depicted as separate components in FIG. 2, the content receiver 202 may be incorporated with the content display device 206. The content display device 206 is, for example, a television, a computer screen, a video screen, or any other display device for displaying content. The content display device 206 is communicatively coupled to the content receiver 202 by way of the transmission link 211.

The controller 208 is generally provided in an area proximate the content receiver 202 and is communicatively coupled to the content display device 206 by way of the transmission link 212, and to the content receiver 202 by way of the transmission link 213. The controller 208 is, for example, a remote control, such as a universal remote control, a dedicated remote control, or a computing device programmed to send command signals (such as selection signals) to the content receiver 202.

Returning to the content receiver 202, the processing unit 224 may be programmed to dynamically configure recording parameters and may dynamically modify recording parameters based on programming information in the form of metadata received from the content provider 204. The metadata may be EPG metadata, may include channel information (such as service level information including local channel information available for the user's locations and channel grouping information for grouping channels capable of being recorded simultaneously), recording information (such event level information including instructions to record or to not record events), and/or may be provided in SI tables that may include SDT and EIT tables. The metadata, such as EPG metadata, may be updated in real-time or near real-time so that the processing unit 224 accurately dynamically configures the recording parameters using up-to-date programming information. This may be useful in cases where breaking announcements are transmitted by a programming channel or where the EPG is updated with corrections.

In some implementations, the processing unit 224 may determine whether the instance of content is to be recorded on a per instance basis. In this case, the metadata may be provided in connection with individual instances of content, and the metadata may include start time and end time information for the instance of content. For example, the processing unit 224 may query metadata for each instance of content and determine whether the instance of content includes associated instructions for recording the instance of content (such as a flag indicating the instance of content is to be recorded in connection with the stored content service feature), the start and end time of the instance of content, as well as other data identifying the instance of content. In addition or alternatively, the processing unit 224 may compare a default or predefined recording timeframe for recording multiple instance of content with a new or updated recording timeframe received from the content provider 204.

In some implementations, the processing unit 224 may dynamically modify the recording parameters, such that the recording parameters to differ from preset or default recording parameters. For example, where the start time or end time of one or more instances of content falls outside of a default recording timeframe, the processing unit 224 may dynamically configure the recording timeframe based on the metadata in order to record the entire length of the instance of content.

In another implementation, where the metadata identifies programming channels to be recorded that differ from a default set of channels to be recorded, the processing unit 224 may dynamically configure the set of programming channels for simultaneous recording. This may be useful where the differing programming channel may be of interest to the user but does not fall within a predefined set of programming channels.

In another implementation, where the metadata identifies an instance of content or set of instances of content that differ from a set of default instances of content, the processing unit 224 may dynamically configure the differing instance of content or set of instances of content to be recorded. This may be useful where the differing instance of content may be of interest to the user but may not fall within a predefined set of instance of content.

The preset or default recording parameters may be based on content provider settings and/or may be associated with a stored content service feature that may be implemented by the content receiver 202. For example, the processing unit 224 may implement the stored content service feature by recording and storing in the memory unit 226, a predefined number of instances of content, for a predefined number of programming channels, and/or for a predefined recording timeframe. According to the implementations provided herein, the default recording parameters for the stored content service feature may be dynamically modified to change the number of instances of content recorded, the number of channels recorded, and/or the recording timeframe.

The modification of the recording parameters may be based on an analysis of the instances of content on a per instance basis, may be based on a comparison of a new or updated recording timeframe received from the content provider (e.g., compared to a previous or default recording timeframe), or both. Such recorded content, or dynamically modified recorded content, may be subsequently available to a user of the content receiver 202 without requiring multiple tuners to receive each of the multiple instances of content, without requiring the smart card 103 to decrypt multiple ECMs, and/or without requiring the combiner 109 to have to descramble multiple signals as described above in connection with the system of FIG. 1.

In some implementations, the processing unit 224 of the content receiver 202 may dynamically configure on screen display content such as an EPG to include information about the dynamically configured recording parameters, thereby visually directing the user to the dynamically modified recordings, which is described below in connection with FIGS. 4B and 4C.

Figure 3:
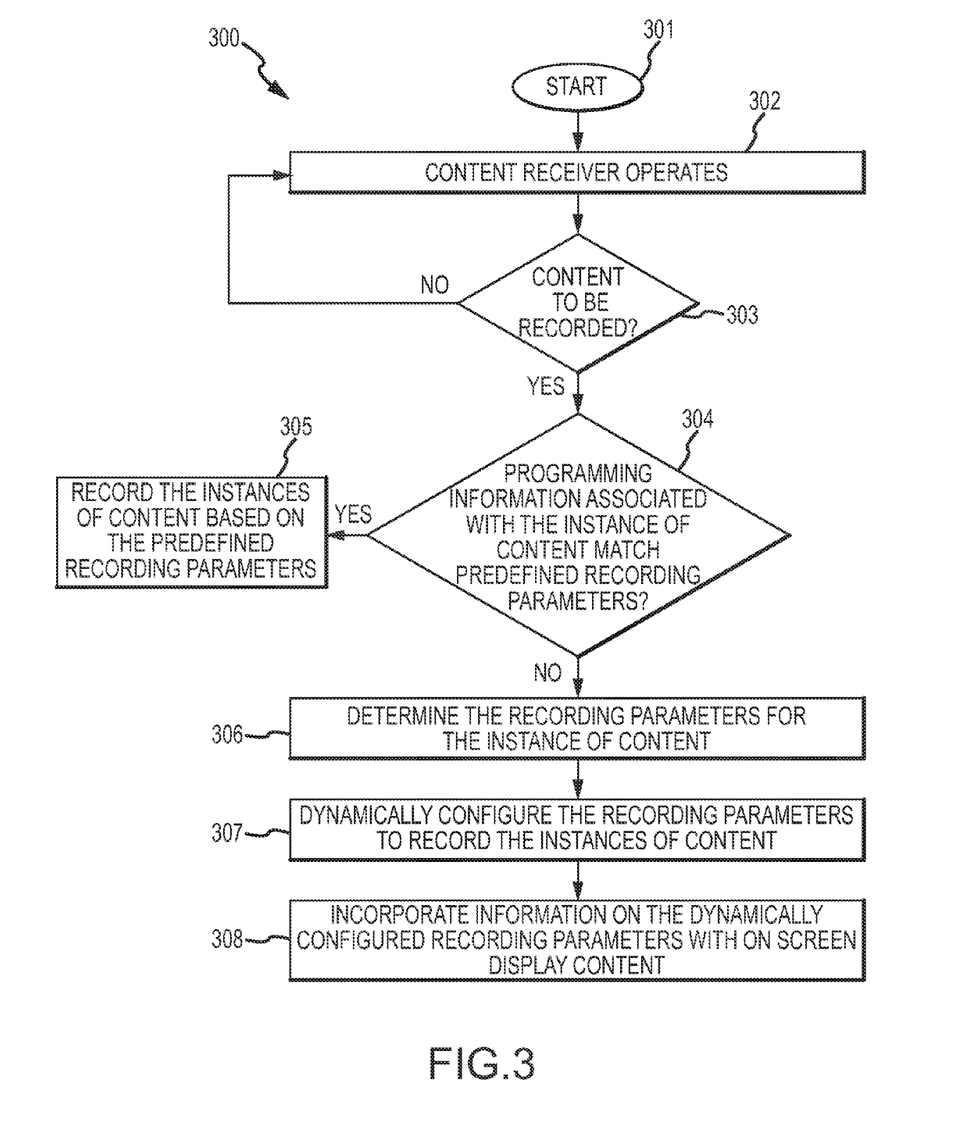
FIG. 3 is a flow chart illustrating a method for dynamically adjusting recording parameters. This method may be performed by the system of FIG. 2.

FIG. 3 illustrates a method 300 for dynamically modifying recording parameters utilizing a content receiver. The method 300 may be performed by the systems 100 and 200 of FIGS. 1 and 2. The flow begins at block 301 and proceeds to block 302 where the content receiver operates. The flow then proceed to block 303 where the processing unit 224 determines whether content is to be recorded. If not, the flow returns to block 302. If so, the flow then proceeds to block 304 where the processing unit 224 optionally determines whether programming information associated with the instance of content (such as metadata identifying the recording status, the start and end time, and other programming information such as EPG data for the instance of content) matches predefined recording parameters. For example, the predefined recording parameters may be a predefined recording group of channels, instances of content for the channels and/or recording timeframe. If so, the flow proceeds to block 305 where the processing unit 224 records the instances of content based on the predefined recording parameters. If not, the flow proceeds to block 306 where the processing unit 224 determines the recording parameters for the instance of content. The flow then proceeds to block 307 where the processing unit 224 dynamically configures the recording parameters to record the instances of content. In some implementations, the flow optionally continues to block 308 where the processing unit 224 incorporates information on the dynamically configured recording parameters with on screen display content, such as an EPG, or on screen display content for overlaying video content, such as live content or previously recorded content.

Returning to block 307, the processing unit 224 may dynamically configure the recording parameters in the manner described above. For example, the processing unit 224 may dynamically configure a recording timeframe and/or the number of instances of content and/or the number of channels to be recorded during the timeframe. The processing unit 224 may implement such a process based on information stored within the memory unit 226 and/or based on metadata (e.g., programming information) received from the content provider 204. In some implementations, the processing unit 224 received programming information on a per instance of content bases and dynamically configures the recording parameters. In addition or alternatively, the processing unit 224 may receive recording parameter information associated with multiple instances of content and, in response, may dynamically configure the recording parameters.

Returning to block 308, the processing unit 224 may incorporate information on the dynamically configured recording parameters with on screen display content, such as an EPG. In some implementations, and as described below in connection with FIGS. 4A and 4B, the EPG may include information on the dynamically configured recording parameter, for example, within a grid of the EPG showing programming information for grouping of instances of content over a channel and timeframe range, or within a message display field proximate the grid, or both. In some implementations, and described below in connection with FIG. 4C, the information on the dynamically configured recording parameter may be incorporated into on screen display content configured as an overlay to video content.

Figure 4A:
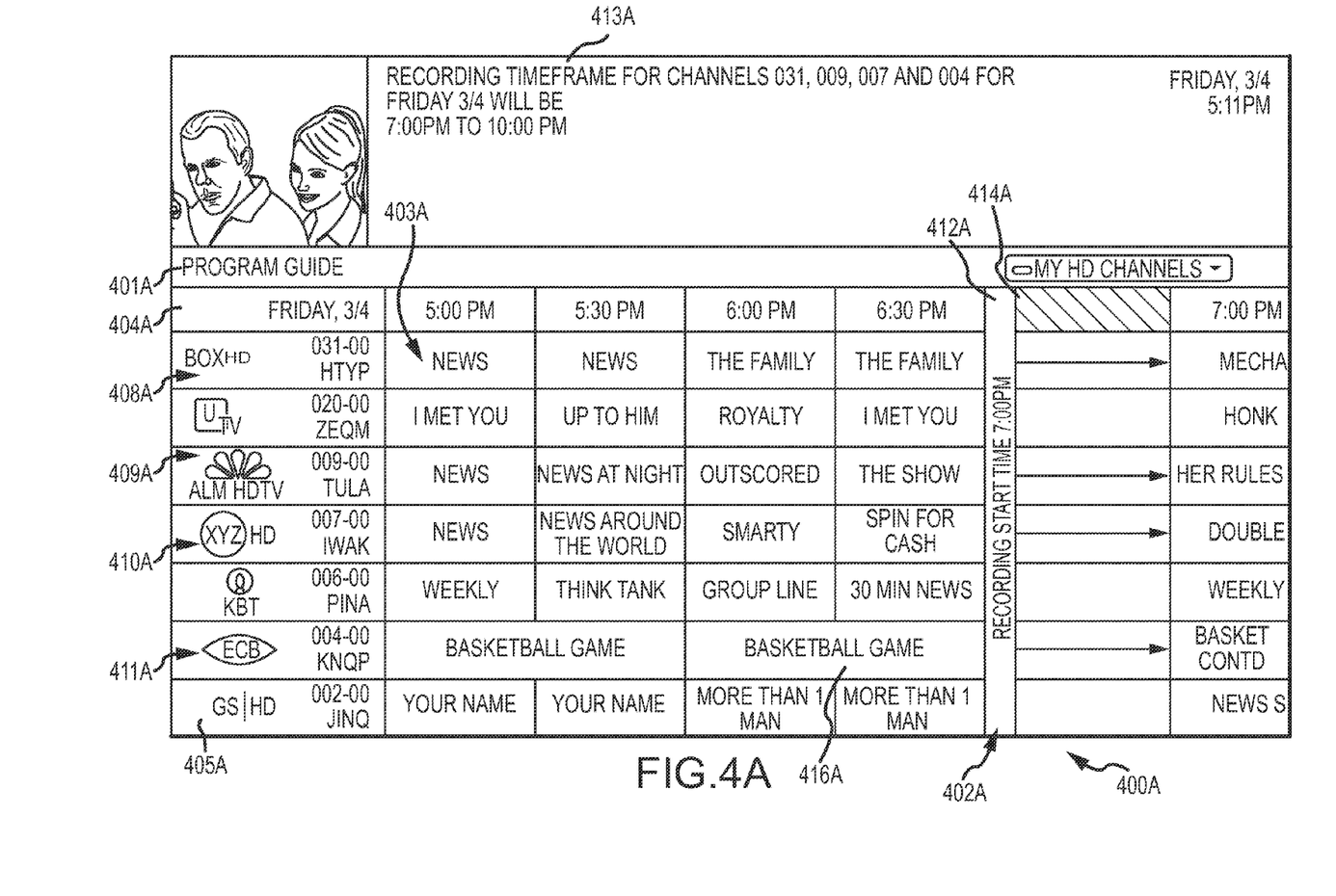
FIG. 4A is a diagram illustrating an electronic programming guide with recording parameters.
Figure 4B:
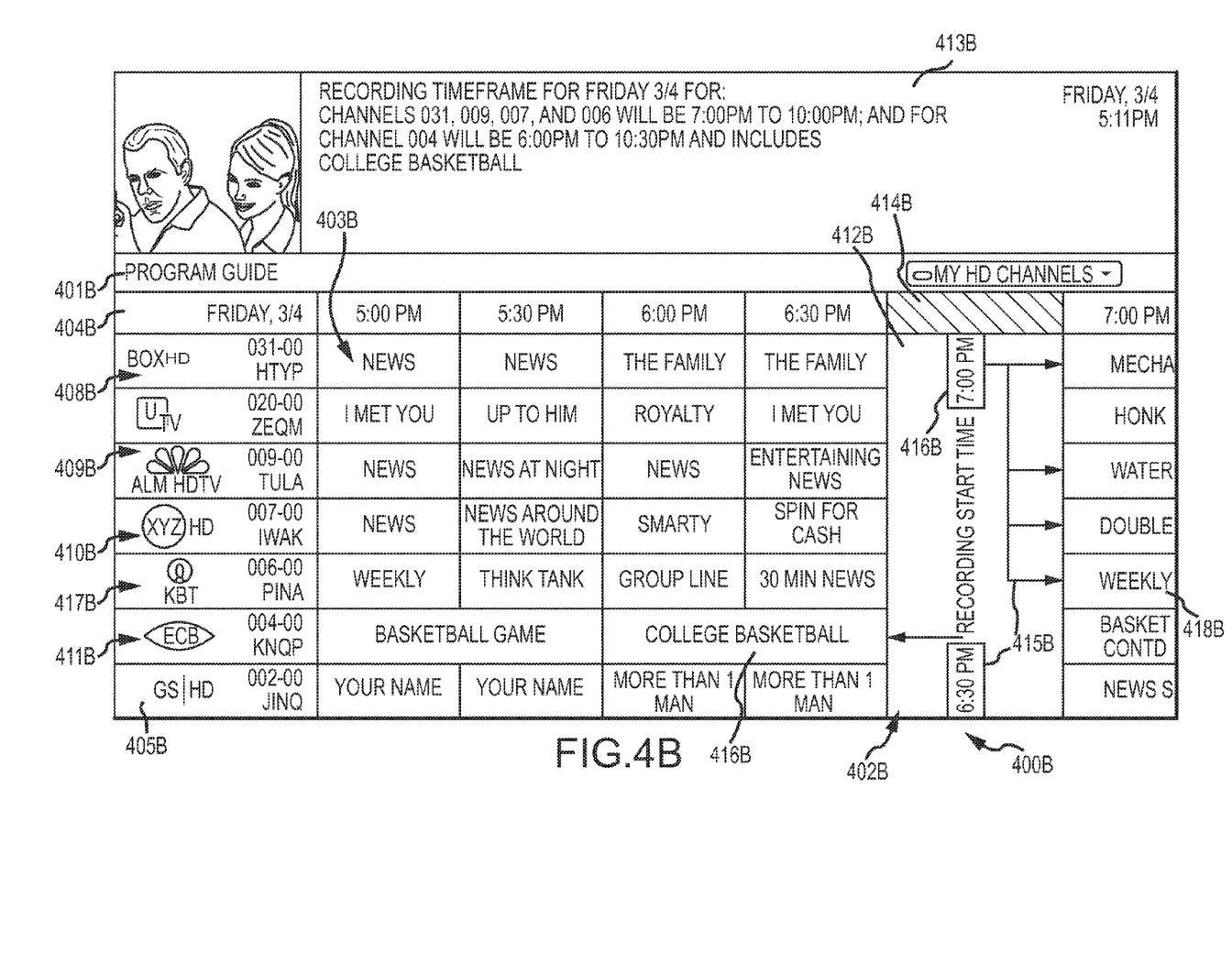
FIGS. 4B and 4C are diagrams illustrating an electronic programming guide with dynamically adjusted recording parameters that may be provided by the system of FIG. 2.
Figure 4C:
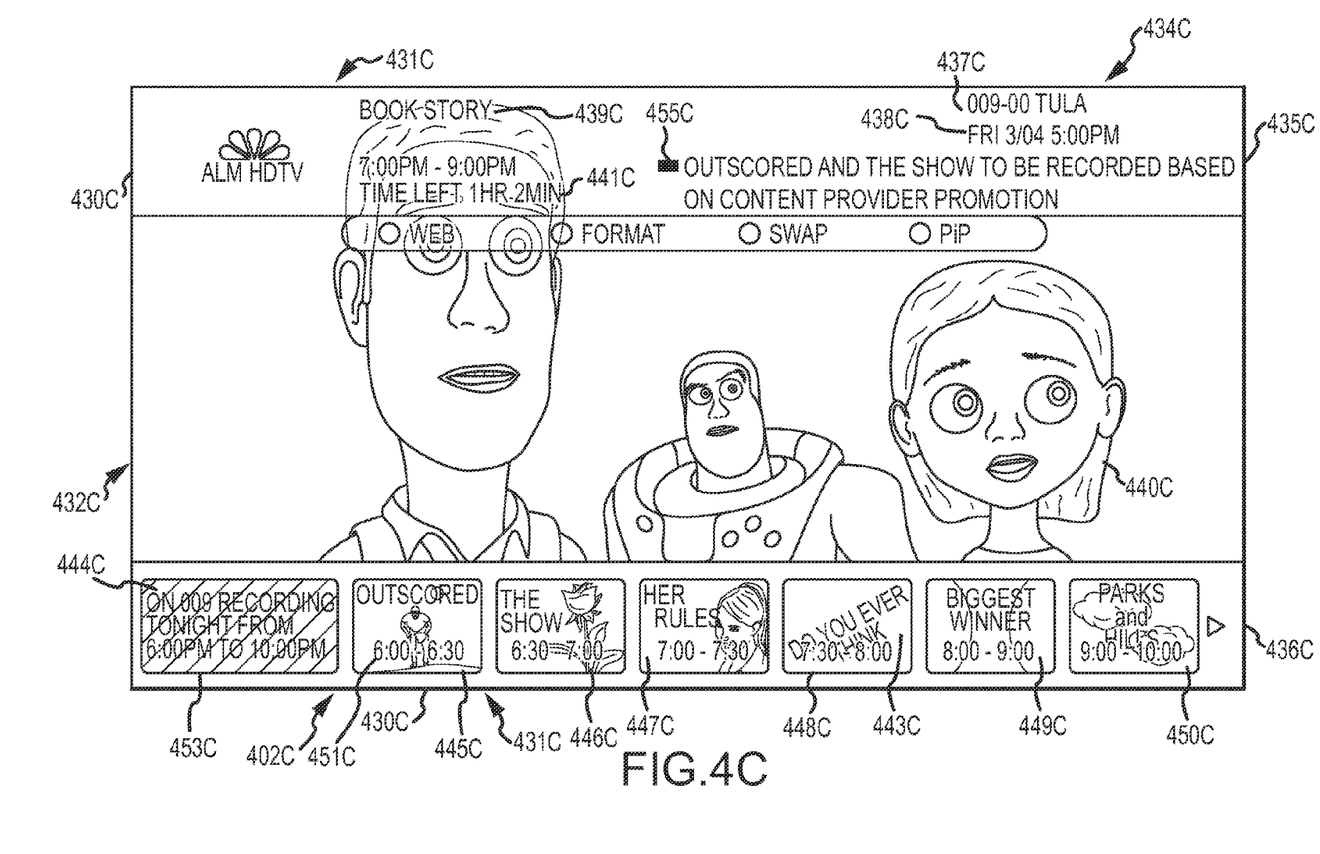

FIGS. 4B and 4C are diagrams illustrating implementations in which information for the dynamically modified recording parameters is provided within on screen display content, which informs the user of the dynamically modified recording parameters and/or recordings. In FIG. 4A, an EPG 401A is shown incorporating a recording timeframe information block 402A within the content provider scheduling information of the EPG. The EPG 401A may be generated utilizing the content receiver 202 in the system of FIG. 2. In FIG. 4A, the EPG 401A is composed of a grid 403A with a date/time axis 404A and a channel axis 405A. The grid 403A is composed of a number of blocks 406A identifying content provider scheduling information 407A such as alpha-numeric text identifying instances of content (e.g., television shows). The recording timeframe information block 402A identifies four channels to be recorded simultaneously, 408A, 409A, 410A and 411A beginning at 7:00 PM. A message 412A may be provided within the recording timeframe information block 402A, e.g., along the channel axis, with information related to the recording timeframe. In FIG. 4A, the message 412 indicates the recording timeframe starts at 7:00 PM for these four channels. In some implementations, the recording timeframe may be a predefined recording timeframe for a number of channels to be recorded simultaneously, described above in connection with FIGS. 1-3. While the recording timeframe information block 402A directly precedes the area of the grid 403B showing the content provider scheduling information for instances of content to be simultaneously recorded beginning at 7:00 PM, the recording timeframe information block 402A may be provided proximate any timeframe within the EPG. In some implementations, additional information about the recording parameters may be displayed in the information field 413A by selecting all or a portion of the recording timeframe information block 402A. In FIG. 4A, the cursor 414A overlies a portion of the recording timeframe information block 402A to cause the information field 413A to display a message about the recording timeframe and the channels to be recorded.

Turning to FIG. 4B, a diagram illustrates information about dynamically modified recording parameters 415B within the EPG grid 403B. The EPG 401B may be generated utilizing the content receiver 202 in the system of FIG. 2. Compared to FIG. 4A, the dynamically modified recording parameters include the instance of content 416B (e.g., college basketball) is to be recorded beginning at 6:00 PM on channel 004, and an additional channel 417B (e.g., channel 006) is to be recorded beginning at 7:00 PM. This information about a dynamically modified recording parameters 415B is incorporated with the recording parameter information 416B that is otherwise unchanged compared to FIG. 4A (e.g., that the instances of content for channels 031, 009, 007 and 006 is to be recorded beginning at 7:00 PM). In some implementations, the additional information about the dynamically modified recording parameters may be displayed in the information field 413B by selecting all or a portion of the recording timeframe information block 402B. In FIG. 4B, the cursor 414B overlies a portion of the recording timeframe information block 402B to cause the information field 413B to display a message about the dynamically modified recording timeframe. For example, compared to FIG. 4A, the dynamically modified recording parameters of FIG. 4B additionally includes recording the additional instance of content 416B at the modified recording timeframe of between 6:00 PM and 10:30 PM, and that the additional channel 417B is to be recorded to capture the additional instances of content 418B. Accordingly, the information field 413B includes information about each of the dynamically modified recording parameters 415B (e.g., the dynamically modified recording timeframe) for the programming channel 411B and the additionally recorded programming channel 417B.

While FIG. 4B shows the information about the dynamically modified recording parameters 415B within the recording timeframe information block 402B, a portion of which relates to the recording timeframe starting time, the recording timeframe information may also be shown as a dynamically adjusted timeframe range, a recording timeframe end time, and so on. In addition, while FIG. 4B displays information about the dynamically modified recording parameters 415B, which indicates an additional channel 417B and that an additional instance of content 416B is to be recorded, less or different channels may be recorded compared to preset or customary recording settings (e.g., the customary four channels shown in FIG. 4A).

FIG. 4C is a diagram illustrating on screen display content 430C including information on the recording timeframe information block 402C. The on screen display content 430C may be provided as an overlay 431C to video content 432C and may be generated utilizing the content receiver 202 in the system of FIG. 2. In FIG. 4C, the on screen display content 430C includes programming information 434C in an upper region 435C and the information on the recording timeframe information block 402C in a lower region 436C.

The upper region 435C includes programming information 434C such as a channel and/or network identifier 437C, a date and/or time field 438C, an identification field 439C identifying the instance of content 440C displayed as the video content 432D, a run and/or remaining time field 441C identifying the run and/or remaining time for the instance of content 440C, and so on.

The instance of content 440C displayed as the video content 432C may be live or previously recorded content. In the lower region 436D of the on screen display content 430D, information identifying information on the recording timeframe information block 402D may be displayed as a series of pictures 443C identifying the instances of content associated with the programming channel 437C that are to be recorded.

The recording timeframe information block 402D includes a message field 444C indicating that the recording timeframe for the programming channel 437C is from 6:00 PM to 10:00 PM. To the right of the message field 444C, the pictures 443C identify the various instances of content 445C, 446C, 447C, 448C, 449C and 450C and their respective timeframes 451C to be recorded for the programming channel 437C. The user may navigate to the information on the recording timeframe information block 402C utilizing the cursor 453C and may select all or a portion of the recording timeframe information block 402B utilizing cursor 453C. In FIG. 4C, the cursor 453C overlies a portion of the recording timeframe information block 402A at the message field 444C, and in response, the content receiver 202 transmits the information field 455C within the upper region 435C to display a message about instances of content to be recorded during the dynamically modified recording timeframe of 6:00 PM to 10:00 PM. For example, compared to preset or customary recording settings in which instance of content are recorded from 7:00 PM to 10:00 PM in FIG. 4A in which instances of content 456A and 457A from programming channels 409A (e.g., programming channel 009) are not set to record, the dynamically modified recording parameters of FIG. 4C additionally include recording the additional instances of content 445C and 446C from programming channel 437C (e.g., programming channel 009) at the modified recording timeframe between 6:00 PM and 10:00 PM.

While the information on the stored content service feature 402C is provided in a separate, lower overlaying region 436C compared to the upper overlaying region 435C in FIG. 4C, the information on the recording timeframe information block 402C may be displayed in any region within the on screen display content 430C, alone or in combination with the programming information 434C, and the region may be an overlay 431C to any portion of the video content 432C (such as at a left side, right side, middle, center, upper and/or lower portion). In addition, the on screen display content 430C may be partially transparent (e.g., as shown in the upper region 435C) or may be opaque (e.g., as shown in the lower region 436C) with respect to the video content 432C.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for handling recording of a plurality of instances of content, the method comprising:
analyzing programming information for the plurality of instances of content to determine for each instance of content of the plurality of instances of content: a start time and an end time, wherein at least some of the plurality of instances of content are scheduled to be broadcast on different television channels at a same time;
performing a first comparison of a start time of a predefined recording time period with each instance of content of the plurality of instances of content;
performing a second comparison of an end time of the predefined recording time period with each instance of content of the plurality of instances of content; and
configuring recording parameters at a content receiver based on the first comparison and the second comparison, wherein configuring the recording parameters at the content receiver based on the first comparison and the second comparison results in one or more instances of content of the plurality of instances of content having recording scheduled to:
start, by the content receiver, prior to the start time of the predefined recording window; and/or
complete, by the content receiver, after the end time of the predefined recording window.

2. The method for handling recording of the plurality of instances of content of claim 1, further comprising:
recording, by the content receiver, the plurality of instances of content based on the configured recording parameters.

3. The method for handling recording of the plurality of instances of content of claim 1 further comprising:
receiving, by the content receiver, from a content provider, at least a portion of the recording parameters.

4. The method for handling recording of the plurality of instances of content of claim 1, further comprising:
outputting, by the content receiver, an electronic programming guide for presentation that indicates the plurality of instances of content to be recorded based on the recording parameters.

5. The method for handling recording of the plurality of instances of content of claim 1, further comprising:
receiving, by the content receiver, the plurality of instances of content via a single tuner of the content receiver.

6. The method for handling recording of the plurality of instances of content of claim 1, wherein the first comparison and the second comparison is performed by a processing unit of the content receiver.

7. A system for handling recording of a plurality of instances of content, the system comprising:
one or more processors; and
a memory communicatively coupled with and readable by the one or more processors and having stored therein processor-readable instructions which, when executed by the one or more processors, cause the one or more processors to:
analyze programming information for the plurality of instances of content to determine for each instance of content of the plurality of instances of content: a start time and an end time, wherein at least some of the plurality of instances of content are scheduled to be broadcast on different television channels at a same time;
perform a first comparison of a start time of a predefined recording time period with each instance of content of the plurality of instances of content;
perform a second comparison of an end time of the predefined recording time period with each instance of content of the plurality of instances of content; and
configure recording parameters at a content receiver based on the first comparison and the second comparison, wherein configuring the recording parameters based on the first comparison and the second comparison results in one or more instances of content of the plurality of instances of content having recording scheduled to:
start prior to the start time of the predefined recording window;
and/or
complete after the end time of the predefined recording window.

8. The system for handling recording of the plurality of instances of content of claim 7, the system further comprising the content receiver, configured to:
record the plurality of instances of content based on the configured recording parameters.

9. The system for handling recording of the plurality of instances of content of claim 8 wherein the content receiver is further configured to:
receive, from a content provider, at least a portion of the recording parameters.

10. The system for handling recording of the plurality of instances of content of claim 8, wherein the content receiver is further configured to:
output an electronic programming guide for presentation that indicates the plurality of instances of content to be recorded based on the recording parameters.

11. The system for handling recording of the plurality of instances of content of claim 5, wherein the content receiver is further configured to:
receive the plurality of instances of content via a single tuner of the content receiver.

12. The system for handling recording of the plurality of instances of content of claim 8, wherein the one or more processors are part of the content receiver.

13. A non-transitory computer-readable medium for handling recording of a plurality of instances of content, comprising processor-readable instructions configured to cause one or more processors to:
analyze programming information for the plurality of instances of content to determine for each instance of content of the plurality of instances of content: a start time and an end time, wherein at least some of the plurality of instances of content are scheduled to be broadcast on different television channels at a same time;
perform a first comparison of a start time of a predefined recording time period with each instance of content of the plurality of instances of content;
perform a second comparison of an end time of the predefined recording time period with each instance of content of the plurality of instances of content; and
configure recording parameters at a content receiver based on the first comparison and the second comparison, wherein configuring the recording parameters based on the first comparison and the second comparison results in one or more instances of content of the plurality of instances of content having recording scheduled to:
start prior to the start time of the predefined recording window;
and/or
complete after the end time of the predefined recording window.

\* \* \* \* \*